United States Patent [19]

Fournier

[11] Patent Number: 4,813,120

[45] Date of Patent: Mar. 21, 1989

[54] METHOD FOR REMOVING O-RINGS AND BACKUP RINGS FROM ANNULAR INDENTATIONS

[76] Inventor: James L. Fournier, 3136 N. 1175E, Layton, Utah 84041

[21] Appl. No.: 95,064

[22] Filed: Sep. 10, 1987

[51] Int. Cl.⁴ .............................................. B23P 19/04

[52] U.S. Cl. ..................................... 29/426.6; 29/235; 29/267; 7/169

[58] Field of Search ....................... 7/169, 170; 29/235, 29/267, 270, 278, 426.6, 451; 81/8.1; 254/25

[56] References Cited

U.S. PATENT DOCUMENTS

| | | | |
|---|---|---|---|
| 532,557 | 1/1895 | Hoffman | 81/8.1 |
| 861,666 | 7/1907 | Merrit . | |
| 2,503,683 | 4/1950 | Perkins | 29/270 |
| 2,661,487 | 12/1953 | Hicks et al. | 12/103 |
| 3,132,414 | 5/1964 | DeBacco et al. | 29/235 |
| 3,145,463 | 8/1964 | Hockett | 29/451 |
| 3,577,848 | 5/1971 | Mengle | 29/235 X |
| 3,879,778 | 4/1975 | Archer | 7/169 |
| 4,034,595 | 7/1977 | Smith | 7/169 |
| 4,141,129 | 2/1979 | Martini | 29/235 |
| 4,233,864 | 11/1980 | Gutierrez, Jr. | 29/275 X |
| 4,330,917 | 5/1982 | Dzurkovich | 29/235 |
| 4,649,618 | 3/1987 | Harrison | 29/235 X |
| 4,722,129 | 2/1988 | Keller | 29/267 |

*Primary Examiner*—Howard N. Goldberg
*Assistant Examiner*—Andrew E. Rawlins
*Attorney, Agent, or Firm*—Robert L. Nathans; Donald J. Singer

[57] ABSTRACT

A tool for extracting seated o-rings from a confining annular indentation having an elongated o-ring prying section coupled to a handle, the prying section including a curved terminal portion affixed to the handle, a recess formed between the curved terminal portion and the handle to deter interference between the tool and shoulder portions of the indentation during prying of the o-ring out of the indentation upon rocking of the handle.

1 Claim, 1 Drawing Sheet

METHOD FOR REMOVING O-RINGS AND BACKUP RINGS FROM ANNULAR INDENTATIONS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of tools and methods for removing resilient o-rings from annular recesses.

Resilient rings are widely utilized for sealing purposes. The o-rings are seated in annular indentations to perform such sealing in, for example, cylindrical cavities which contain pistons and the like. The removal of such o-rings from the annular cavities is typically performed by utilizing a variety of tools which are not designed for this purpose. One type of such tool is a metal scribe, which often digs into the o-ring during the removal process, to damage it. Use of these tools also tends to damage the corners of the annular indentations or cavitites when the tool is rocked to pry the o-ring out of the indentation.

Furthermore, annular backup rings are also fitted within the annular recess above and below the o-rings in order to prevent them from being twisted within the annular recess when the o-rings contact a sliding component, e.g. a piston. These backup rings are relatively stiff, in contrast with the more resilient o-rings, and also must be removed from the annular cavity from time to time.

OBJECTS AND SUMMARY OF THE INVENTION

Accordingly, it is an object of the present invention to provide a tool or tools for readily moving resilient o-rings from the annular cavities without damage to the o-rings or to portions of the annular cavities containing the o-rings.

It is a further object of the present invention to provide a tool or tools for readily removing relatively stiff backup rings, often installed with the o-rings, from the annular cavities without damaging the cavities or the backup rings.

It is further object of the invention to provide a standardized tool which replaces a variety of tools currently utilized to perform these functions. A preferred tool for extracting seated o-rings from a confining annular indentation comprises an elongated o-ring prying portion coupled to a knurled handle, the prying portion including an upwardly curved terminal portion affixed to the handle, and a downwardly curved recess formed between the upwardly curved terminal portion and the handle to deter interference between the tool and shoulder portions of the indentation during prying of the o-ring out of the indentation upon rocking of the handle. The o-ring prying portion has a rounded nose to prevent o-ring damage. A similar tool having a pointed nose portion is also provided for removing annular backup rings from the annular indentation. Both tools are made from a soft, yet fairly rigid material to prevent damage to the components.

BRIEF DESCRIPTIONS OF THE DRAWINGS

Other objects, features, and advantages of the present invention will become apparent upon study of the following description taken in conjunction with the drawings in which.

DETAILED DESCRIPTION OF THE PREFERRED EMBODIMENTS

Figure 1:
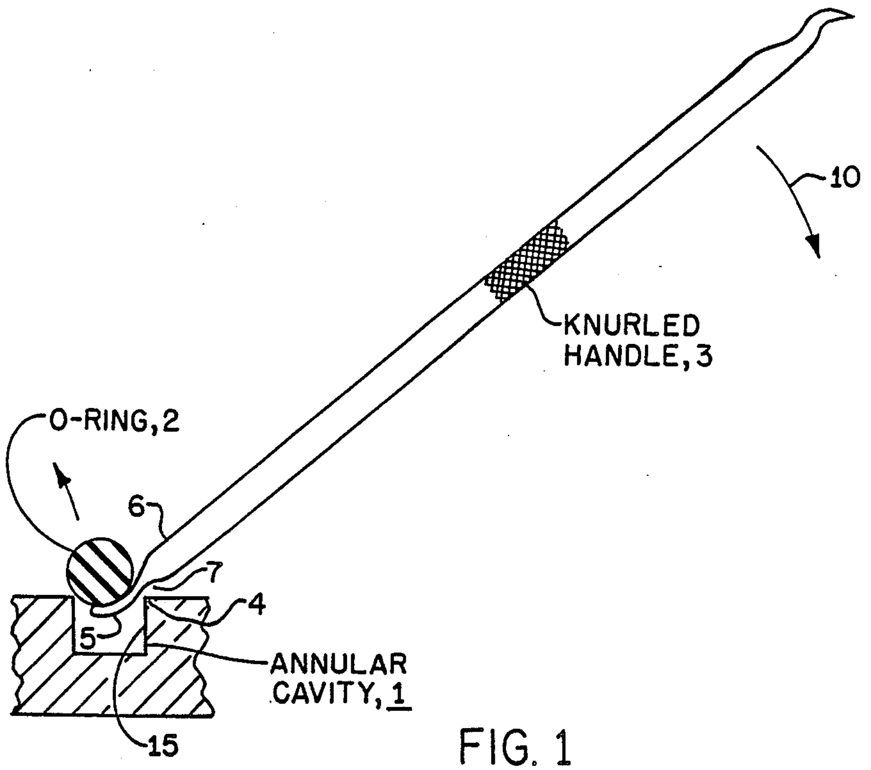
FIG. 1 illustrates the preferred embodiment of the novel tool of the present invention while being utilized to unseat an o-ring from an annular indentation.
Figure 2:
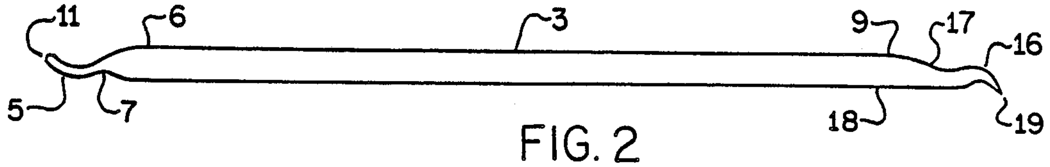
FIGS. 2 and 3 illustrate side and top views of the aforesaid tool.
Figure 3:
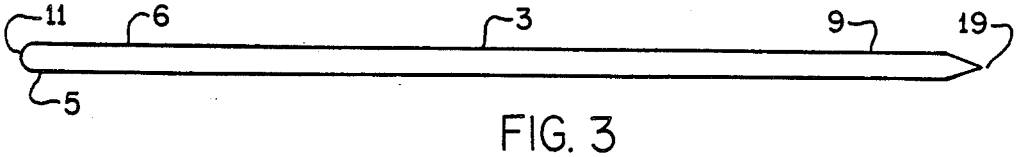

FIG. 1 illustrates the aforesaid annular cavity recess 1 in cross section, together with o-ring 2 also in cross section, being pried out of the cavity by the novel tool of the invention. An elongated handle 3 is illustrated, together with an upwardly curved prying portion 5, coupled to first terminal portion 6 of handle 3 as illustrated. A downwardly curved or substantially triangular recess 7 is positioned as illustrated, and is laterally offset with respect to the upwardly curved prying section 5 having a flattened spoon shaped configuration. As indicated in FIGS. 2, and 3, the prying section has a thickness substantially less than the width thereof. Preferably, the tip portion 11 of the prying portion is configured in the shape of a rounded nose as illustrated in FIG. 3.

When o-ring 2 is completely seated within cavity 1, the surface of the spoon-like prying section is slipped between the right hand portion of o-ring 2 and the right hand vertical shoulder portion 15 of the annular recess 1, whereby the upper surface of the prying section is in contact with the right hand side portion of o-ring 2. The user thereafter downwardly displaces the handle 3 in the direction indicated by arrow 10, whereby o-ring 2 is lifted or pryed out of cavity 1, as illustrated in FIG. 1. Unlike the use of the aforesaid scribe, the smooth spoon shaped prying section will not damage the o-ring. Furthermore, the sharp corner 4 of cavity 1, will not be injured by the use of the tool of the present invention, since the downwardly curved or triangular recess 7 will provide adequate clearance upon the movement of tool in the direction indicated by the arrow 10. Thus recess 7 enables removal of the ring without damaging it so that it may be reused, and without damage to the corner 4 of cavity 1. After assuming the position indicated in FIG. 1, o-ring 2 is grasped by the users fingers, and is removed from cavity 1.

Figure 4:
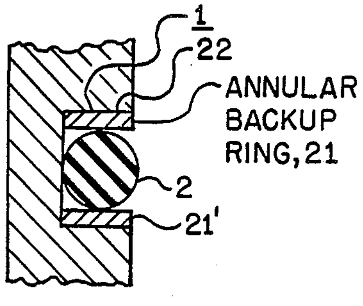
FIG. 4 PRIOR ART
FIG. 4 illustrates the positioning of the annular backup rings within the annular cavity.

FIG. 4 illustrates in cross section the aforesaid o-ring contacting an upper and lower annular backup ring for preventing rolling or twisting of the o-ring within annular recess 1. The o-ring 2 is removed from the annular cavity 1 illustrated in FIG. 4, in the same manner as described above. Annular backup ring 21 is thereafter easily removed by the use of a somewhat modified prying section 16, which is pointed at tip 19 thereof, as illustrated in FIGS. 2 and 3. Point 19 is inserted between the upper surface of backup ring 21, and cavity portion 22, and an upward rocking motion of handle 3 will enable the backup ring 21 to be manually pulled out of cavity 1. The lower annular backup ring 21′ is removed from the annular cavity in like manner. Curved prying section 16 is coupled to the terminal portion 9 of handle 3 and recess 17 is laterally offset from the curved prying section, to prevent damage to the corner of cavity 1, which could occur in the absence of the recess.

The illustrated tool is made of a relatively soft yet rigid material which could be brass, although the most preferred material is a commercially available plastic rod having a diameter of 0.25 inches, sold under the trademark Lexan. Handle 3 is preferably knurled, since the user often has oily hands, due to the manipulation of hydraulic components, utilizing the o-rings.

Other embodiments of the invention will become apparent to the worker in the art, and thus the scope of the invention is to be limited only by the terms of the following claims and equivalents thereof. For example, both of the above described tools are preferably positioned at opposite ends of a single handle. It is however within the scope of the invention, that two separate tools may be utilized.

What is claimed is:

1. A method for extracting seated o-rings and backup rings from a confining annular indentation comprising the steps of:

(a) providing a tool including an elongated o-ring prying means coupled to a first portion of a handle, said o-ring prying means including a curved terminal portion having a rounded nose and a recess formed between said curved terminal portion and said first portion of said handle to deter interference between said tool and shoulder portions of said indentation during prying of said o-ring out of said indentation upon rocking of said handle, together with an elongated backup ring prying means coupled to a second portion of said handle, said backup ring prying means including a curved terminal portion affixed to a second portion of said handle and having a pointed tip, a recess formed between the curved terminal portion of said backup ring prying means and said second portion of said handle to deter interference between said tool and shoulder portions of said indentation during prying of said backup rings out of said indentation upon the rocking of said handle;

(b) inserting said o-ring prying means between said o-ring and a portion of said indentation;

(c) rocking said handle to cause said o-ring to be dislodged from said indentation;

(d) inserting said backup ring prying means between a first one of said backup rings and a portion of said indentation;

(e) rocking said handle to cause a first one of said backup rings to be dislodged from said indentation;

(f) inserting said backup ring prying means between a second one of said backup rings and a portion of said indentation; and (g) rocking said handle to cause a second one of said backup rings to be dislodged from said indentation.

* * * * *